No. 821,688. PATENTED MAY 29, 1906.
P. A. WHITNEY & R. C. ELLRICH.
CHUCK.
APPLICATION FILED DEC. 27, 1904.
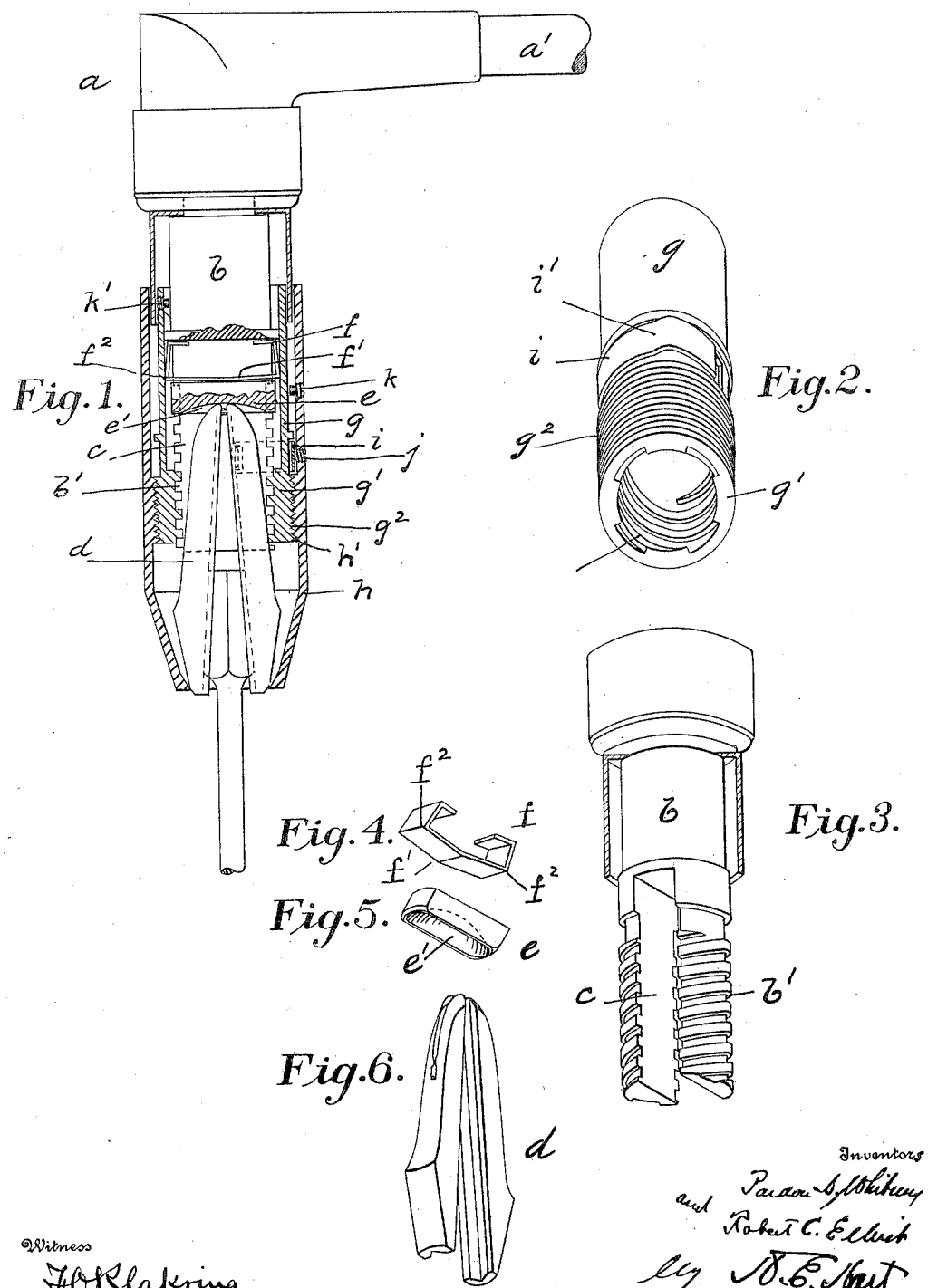

UNITED STATES PATENT OFFICE.

PARDON A. WHITNEY AND ROBERT C. ELLRICH, OF SOUTHINGTON, CONNECTICUT, ASSIGNORS TO PECK, STOW & WILCOX COMPANY, OF SOUTHINGTON, CONNECTICUT, A CORPORATION OF CONNECTICUT.

CHUCK.

No. 821,688.   Specification of Letters Patent.   Patented May 29, 1906.

Application filed December 27, 1904. Serial No. 238,319.

*To all whom it may concern:*

Be it known that we, PARDON A. WHITNEY and ROBERT C. ELLRICH, citizens of the United States of America, residing at Southington, in the county of Hartford and State of Connecticut, have invented certain new and useful Improvements in Chucks, of which the following is a specification.

The invention is illustrated as applied to bit-brace chucks, the object of the invention being to produce a device of the character specified having features of novelty and advantage and relates particularly to the mechanism for closing the jaws.

In the drawings, Figure 1 is an elevation view, with some parts shown in central vertical section, of a bit-brace chuck embodying our invention. Fig. 2 is a perspective view of the inner sleeve. Fig. 3 is a perspective view of the spindle. Fig. 4 is a detail perspective view of the gripping member. Fig. 5 is a detail perspective view of the jaw-block. Fig. 6 is a perspective view of the jaws.

Referring to the drawings, $a$ is the head, which is secured to the brace-sweep $a'$ and has secured to it the spindle $b$, slotted at its lower end, as at $c$, to receive the jaws $d$. $e$ is a block fitting in the slot in the shank, recessed at $e'$ to receive the inner ends of the jaws. The member $f$ is also located in the slot and has a crowned surface $f'$, on which the block rests. This member $f$ is of spring metal bent to the desired shape, and normally its edges lie flush with the surface of the spindle; but when pressure is brought to bear on its crowned surface it expands so that its edges $f^2 f^2$ project beyond the surface of the spindle, for the purpose which will be hereinafter described.

The spindle is exteriorly threaded, as at $b'$, with a coarse thread, the pitch of the thread being preferably about one to an inch. A sleeve $g$ is interiorly threaded to fit the threads on the spindle. This sleeve has a hub $g'$, threaded, as at $g^2$, with a fine-pitched thread. An outer sleeve $h$ is interiorly threaded, as at $h'$, to fit the threads on the inner sleeve. This sleeve has a conical end and a central aperture through which the jaws project, lengthwise movement of this sleeve with relation to the jaws closing and opening them. The inner sleeve carries a spring $i$, which engages the interior surface of the outer sleeve and forms a frictional connection between the two sleeves. In order to insure that this frictional connection shall be sufficient, I provide a screw $j$, which is threaded onto the outer sleeve and may be screwed down onto the spring $i$ for this purpose. Preferably I form a slight depression across the spring, as at $i'$, at a point so that it will receive the screw $j$ when the parts begin to move to close the jaws. The outer sleeve carries a second screw $k$, which is adapted to engage a ledge on the inner sleeve to prevent the outer sleeve from being accidentally turned off of the inner sleeve, and the inner sleeve carries a screw $k'$, which engages a shoulder on the spindle to prevent the inner sleeve from being accidentally turned off of the spindle.

Assuming that the jaws are in wide-open position and a tool inserted between them, the outer sleeve is grasped and turned to the right. The frictional engagement between the outer and inner sleeves causes the inner sleeve to turn with the outer sleeve, and both sleeves move backward simultaneously on the quick-threads, closing the jaws onto the tool-shank, and the two sleeves will continue to move backward together on the coarse thread, causing a rapid initial closing of the jaws. This sets the jaws back onto the crowned face of the gripping member $f$, flattening this crowned face and expanding the member until its edges $f^2 f^2$ engage the interior of the inner sleeve, thus locking the sleeve to the spindle.

The frictional engagement between the outer and inner sleeves is not strong enough to transmit sufficient power to the inner sleeve to further close the jaws on the coarse thread, and as a consequence the frictional engagement between the two sleeves is broken, and while the outer sleeve may continue to rotate on the fine thread $g^2$ to further close the jaws the inner sleeve remains stationary.

If there were no means for locking the inner sleeve to the spindle after the jaws had been closed as much as they can be on the coarse thread, the continued movement of the outer sleeve would tend to run the inner sleeve out on the coarse thread and open the jaws. In order to avoid this, the above-described gripping device is provided, which operates in the following manner:

While the two sleeves are running together on the coarse thread the jaws are set back onto the block $e$, which in turn tends to flatten out the crowned surface of the gripping member $f$, expanding it, so that its edges $f^2 f^2$ engage the interior surface of the inner sleeve, thus locking it to the spindle $b$. As a consequence further movement of the outer sleeve causes it to ride back on the fine thread $g^2$, this fine thread proivding a sufficient leverage to close the jaws firmly on the tool-shank, so much so that a chuck made as above described will hold any size or kind of tool, either wood-boring or twist drills.

By this invention the jaws are quickly closed onto the tool-shank by the coarse threads and subsequently firmly closed by the fine thread, reducing the time necessary to insert a tool into a chuck of this character and giving a much firmer grip than is possible in the ordinary style of chuck.

When two sleeves are to be turned successively by hand, the user is often confused as to which to use first, and in consequence the utility of the device is somewhat impaired; but in the device above illustrated and described the two effects—the quick initial closing of the jaws and the final hard pinch—are accomplished by the single sleeve.

We claim as our invention—

1. In a chuck a spindle, jaws carried thereby, a pair of sleeves one of which is contained within the other, interengaging threads of fine pitch on said sleeves, a further and yielding frictional connection between said sleeves, and interengaging threads of coarse pitch on the spindle and said inner sleeve, all substantially as described and for the purposes set forth.

2. In a chuck a spindle, jaws carried thereby, a pair of sleeves one of which is contained within the other, interengaging threads of fine pitch on said sleeves, a further and yielding frictional connection between said sleeves, and interengaging threads of coarse pitch on the spindle and the inner sleeve.

3. In a chuck a spindle, jaws carried thereby, a pair of sleeves one of which is contained within the other, interengaging threads of fine pitch on said sleeves, a further and yielding frictional connection between said sleeves, interengaging threads of coarse pitch on the spindle and said inner sleeve, and a gripping device carried by the spindle and operated upon the closing of the jaws to engage the inner sleeve and lock it to the spindle.

4. In a chuck a spindle, jaws carried thereby, a pair of sleeves one of which is contained within the other, interengaging threads of fine pitch on said sleeves, the outer sleeve being adapted for movement independently of the inner sleeve but having a further and yielding frictional connection therewith to normally cause them to rotate together, and interengaging threads of coarse pitch on the spindle and the inner sleeve.

5. In a chuck a spindle, jaws carried thereby, a pair of sleeves one of which is contained within the other, interengaging threads of fine pitch on said sleeves, interengaging threads of coarse pitch on the spindle and said inner sleeve, said outer sleeve terminating in a conical jaw-closing end, a further and yielding frictional engagement between said sleeves whereby they are caused to move together to effect the initial closing of the jaws, and means for locking the inner sleeve to the spindle when the initial closing of the jaws has been accomplished.

6. In a chuck a spindle, jaws carried thereby, a pair of sleeves one of which is contained within the other, interengaging threads of fine pitch on said sleeves, interengaging threads of coarse pitch on the spindle and said inner sleeve, said outer sleeve terminating in a conical jaw-closing end, a further and yielding frictional engagement between said sleeves to cause their simultaneous initial movement on the coarse thread to close the jaws, means for locking the inner sleeve to the spindle after said initial movement, said outer sleeve being adapted for further movement on said fine thread independently of the inner sleeve to finally close said jaws.

7. The combination in a chuck with the slotted spindle and the jaws located in said slot, of a pair of sleeves located one within the other, the inner sleeve being threaded onto said spindle by threads of coarse pitch and the outer sleeve being threaded onto said inner sleeve by threads of fine pitch, a further and yielding frictional engagement between said sleeves, means for varying the intensity of said engagement, and an expansible gripping device carried by the spindle and adapted to engage the inner sleeve, all substantially as described and for the purposes set forth.

8. A chuck comprising in combination a spindle and jaws; two operating-sleeves interthreaded upon each other and one threaded upon the spindle, the pitch of said threads being materially different, and a single gripping means for rotating both sleeves; and yielding means apart from said threads for causing one sleeve to turn with the other until the jaws are initially closed by the action of the thread of greatest pitch but then permitting one sleeve to thread upon the other to bring greater power to close the jaws.

9. A chuck comprising in combination a spindle, jaws carried thereby, an internal quick-acting sleeve mounted on said spindle and an external slow-acting sleeve threaded on and inclosing said quick-acting sleeve, and means apart from said threads for normally causing the rotation of the slow-acting sleeve to rotate the quick-acting sleeve to rapidly close the jaws, but capable of yielding when the jaws are approximately closed permitting the slow-acting sleeve to be operated to more forcibly close the jaws.

10. In a chuck a spindle, jaws carried thereby, a pair of sleeves one of which is contained within the other, interengaging threads of fine pitch on said sleeves, a spring carried by one sleeve and having frictional engagement with the other, and interengaging threads of coarse pitch on the spindle and said inner sleeve, all substantially as described and for the purposes set forth.

In testimony whereof we affix our signatures in presence of two witnesses.

PARDON A. WHITNEY.
ROBERT C. ELLRICH.

Witnesses:
MICHAEL H. GILL,
THOMAS F. WELCH.